(12) United States Patent
Fink

(10) Patent No.: US 8,912,757 B2
(45) Date of Patent: *Dec. 16, 2014

(54) TRACTION BATTERY WITH INCREASED RELIABILITY

(75) Inventor: Holger Fink, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 666 days.

This patent is subject to a terminal disclaimer.

(21) Appl. No.: 13/138,375

(22) PCT Filed: Dec. 14, 2009

(86) PCT No.: PCT/EP2009/067084
§ 371 (c)(1),
(2), (4) Date: Aug. 8, 2011

(87) PCT Pub. No.: WO2010/088999
PCT Pub. Date: Aug. 12, 2010

(65) Prior Publication Data
US 2011/0285351 A1    Nov. 24, 2011

(30) Foreign Application Priority Data

Feb. 6, 2009 (DE) .......................... 10 2009 000 676

(51) Int. Cl.
*H02J 7/00* (2006.01)
*H01M 10/44* (2006.01)
*H01M 10/46* (2006.01)

(52) U.S. Cl.
CPC ............. *H01M 10/44* (2013.01); *H02J 7/0031* (2013.01); *H01M 10/441* (2013.01); *H01M 10/46* (2013.01)
USPC .......................................... 320/117; 320/134

(58) Field of Classification Search
CPC ... Y02E 60/12; G01R 31/3658; H02J 7/0021; H02J 7/0016; H02J 7/0031; H02J 2007/004; H02J 2007/0037; Y02T 10/7055; H01M 10/48
USPC .......................................................... 320/117
See application file for complete search history.

(56) References Cited

U.S. PATENT DOCUMENTS 5,498,950 A * 3/1996 Ouwerkerk ................... 320/119
5,773,962 A    6/1998 Nor (Continued)

FOREIGN PATENT DOCUMENTS

| CN | 1599965 A | 3/2005 |
|----|-----------|--------|
| JP | 2000182598 A | 6/2000 |
| JP | 2008-125158 A | 5/2008 |

*Primary Examiner* — Arun Williams
(74) *Attorney, Agent, or Firm* — Maginot, Moore & Beck LLP

(57) ABSTRACT

The invention relates to a traction battery having at least two serially connected battery modules, each of which has a first battery module pole, a second battery module pole, and at least one inserted series circuit and/or parallel circuit of battery cells. A first terminal of the series circuit of battery modules is connected to a first battery pole, while a second terminal of the series circuit of battery modules is connected to a second battery pole. According to the invention, at least one battery module of the at least two serially connected battery modules is a first battery module which has at least one disconnecting device and a bridging device. When triggered accordingly, the at least one disconnecting device interrupts the connection between the series circuit and/or parallel circuit of battery cells and the first battery module pole and/or the second battery module pole and/or interrupts the series circuit and/or parallel circuit of battery cells. Furthermore, the first battery module pole and the second battery module pole are short-circuited via the bridging device inserted between the first battery module pole and the second battery module pole when the bridging device is triggered accordingly. Additionally or alternatively, at least one battery module of the at least two serially connected battery modules is a second battery module that has at least one charging and disconnecting device and a bridging device. When triggered accordingly, the at least one charging and disconnecting device interrupts the connection between the series circuit and/or parallel circuit of battery cells and the first battery module pole and/or the second battery module pole and/or interrupts the series circuit and/or parallel circuit of battery cells and limits charging or compensating currents occurring when the battery module or the battery comprising the battery module is connected. Furthermore, the first battery module pole and the second battery module pole are short-circuited via the bridging device inserted between the first battery module pole and the second battery module pole when the bridging device is triggered accordingly.

8 Claims, 5 Drawing Sheets

(56) References Cited

U.S. PATENT DOCUMENTS

| | | | |
|---|---|---|---|
| 5,825,155 A * | 10/1998 | Ito et al. | 320/118 |
| 6,121,752 A * | 9/2000 | Kitahara et al. | 320/122 |
| 6,580,249 B2 * | 6/2003 | Yau et al. | 320/122 |
| 6,593,669 B1 | 7/2003 | Lemaire et al. | |
| 6,828,798 B2 * | 12/2004 | Morimoto | 324/527 |
| RE40,663 E | 3/2009 | Silverman | |
| 2003/0071523 A1 | 4/2003 | Silverman | |
| 2003/0132732 A1 * | 7/2003 | Thomas et al. | 320/134 |
| 2006/0071639 A1 * | 4/2006 | Ross et al. | 320/116 |
| 2006/0071640 A1 * | 4/2006 | McCool et al. | 320/116 |
| 2009/0140694 A1 * | 6/2009 | Zeng | 320/118 |
| 2009/0322155 A1 * | 12/2009 | Oh et al. | 307/87 |
| 2010/0019725 A1 * | 1/2010 | Nakatsuji | 320/118 |

* cited by examiner

TRACTION BATTERY WITH INCREASED RELIABILITY

CROSS-REFERENCE TO RELATED APPLICATION

This application is a 35 USC 371 application of PCT/EP 2009/067084 filed on Dec. 14, 2009.

BACKGROUND OF THE INVENTION

1. Field of the Invention

The present invention relates to a battery, in particular a traction battery.

2. Description of the Prior Art

It has become apparent that in the future, both in stationary applications (e.g. wind power stations) and in vehicles (e.g. in hybrid and electric vehicles), there will be increased use of new battery systems that will be subjected to very strict requirements with regard to reliability. The reason for these strict requirements is that a failure of the battery can result in a failure of the overall system (e.g. in an electric vehicle, a failure of the traction battery results in a so-called "stranded vehicle") or even in a safety-related problem (in wind power stations, for example, batteries are used for adjusting the rotor blades so as to protect the system from impermissible operating states).

The schematic wiring diagram of a battery system according to the current prior art is shown in FIG. 9. To achieve the required performance and energy data with the battery system, individual battery cells are connected in series and partially also in parallel. In addition to the battery cells, the battery system also has a so-called charging and disconnecting device that is shown in FIG. 9 as being situated between the plus pole of the battery and the battery cells, without limiting general design freedom. The circuit breaker TS can be used to switch the battery on and off in monopolar fashion. As an optional functional unit, FIG. 9 shows another disconnecting device with which the battery—if necessary by means of another circuit breaker—can be switched off in bipolar fashion. In the charging and disconnecting device, there is also a so-called charging switch with which a charging resistance can be connected between the battery cells and the externally connected systems in order to limit the equalizing currents when switching on the battery. In such a switching-on procedure, if the circuit breaker is open, then the charging switch in the charging and disconnecting device is first closed and also—if provided—the circuit breaker in the optional disconnecting device on the minus pole of the battery system is closed. Then the input capacitances of the externally connected systems are charged via the charging resistance. If the voltage between the plus pole and minus pole of the battery system deviates only insignificantly from the sum voltage of the battery cells, then the charging procedure is terminated by the closing of the disconnecting switch in the charging and disconnecting device. The battery system is then connected to the external systems in a low-impedance fashion and can be operated with its specified performance data. With the above-explained procedure, the equalizing currents that occur between the external systems and the battery system at the switching-on of the battery system can be limited to permissible values.

The reliability of the battery system is indicated by the failure rate. The failure rate describes the number of failures to be expected on average in a given period of time.

The failure rate of a battery with a series circuit of individual cells can be determined as follows:

$$\text{Failure rate}_{traction\ battery} = 1 - (1 - \text{failure rate}_{cell})^{number\ of\ cells} \quad (1)$$

The traction battery of an electric vehicle with a series circuit of 100 cells and a failure rate of 100 ppm/cell in the given period of time, for example, thus yields the following:

$$\text{Failure rate}_{traction\ battery} = 1 - (1 - 100\ \text{ppm})^{100} \quad (2)$$

$$= 9.95\%_0$$

With very low failure rates of the individual battery cells (e.g. failure rate$_{cell}$<1°/$_{00}$ in the given time period), the failure rate can be calculated approximately as follows (the power series expansion of the binomial series interrupted after the first term):

$$\text{Failure rate}_{traction\ battery} \approx \text{number of cells} * \text{failure rate}_{cell} \quad (3)$$

The failure rate of the traction battery in question is therefore about 100 times greater than the failure rate of an individual cell. The failure rate of the individual cells must therefore be smaller by a factor of approximately 100, given the required values for the failure rate of the battery system. For a battery system with 100 series connected cells, if a failure rate of 100 ppm in the given period of time is required, then the cells must have a failure rate of 1 ppm during this period of time. This is a requirement that is extremely hard to fulfill.

OBJECT AND SUMMARY OF THE INVENTION

The object of the invention is to increase the reliability of battery systems in comparison to the current prior art. With the invention, the failure of one or more cells of a battery module should not result in the complete failure of the battery system. The battery system should then still be available with limited power.

The battery according to the invention has the advantage over the prior art that the battery system is internally modified relative to the current prior art by adding functional units. These additional functional units include
  disconnecting devices and/or
  charging and disconnecting devices and/or
  bridging devices
that will be described in greater detail below. These functional units have been used according to the invention to construct battery modules that can be bridged over upon failure of one or more cells. If the overall system is composed of a plurality of such battery modules, then—depending on the requirements and the embodiment of the battery system—one or more of the battery modules can be bridged over upon failure of one or more cells in the corresponding module. The battery system does then have a limited power at its terminals as compared to regular operation, but with a suitable design of the battery system, it is possible to prevent the system from failing or shifting into a safety-critical state. In addition, the failure of the cells or module is detected and repair procedures can be initiated. This increases the reliability of the battery system.

In a particularly preferred embodiment, the battery according to the invention includes a charging device that is connected between the first terminal of the series circuit of battery modules and the first battery pole and/or is connected between the second terminal of the series circuit of battery modules and the second battery pole, with the battery including only first battery modules. In this case, in the event of a failure of any of the battery modules, a limiting of the equalizing currents in the traction electrical system is assured; only simply designed first battery modules are provided.

In an alternative embodiment, the battery according to the invention preferably includes only second battery modules. In this case, even if any of the battery modules fails, a limiting of the equalizing currents in the traction electrical system takes place; it is not necessary to provide a separate charging device since the second battery modules are each equipped with one. This permits a simpler assembly of the battery, which is composed exclusively of identical modules.

In an alternative embodiment, the battery according to the invention preferably includes n battery modules: 2 second battery modules and n−2 first battery modules. In this case, even if one of the second battery modules fails, a limiting of the equalizing currents in the traction electrical system is assured since in this case, the charging device of the second of the second battery modules is still present and can be used.

In the battery according to the invention, the bridging device is preferably also embodied or alternatively embodied so that it can produce a short-circuit of the first battery module pole and second battery module pole only if there is an interruption of the connection between the series circuit and/or parallel circuit of battery cells and the first battery module pole and/or an interruption of the connection between the series circuit and/or parallel circuit of battery cells and the second battery module pole and/or an interruption of the series circuit and/or parallel circuit of battery cells.

BRIEF DESCRIPTION OF THE DRAWINGS

Exemplary embodiments of the invention will be described in detail below with reference to the accompanying drawings.

DESCRIPTION OF THE PREFERRED EMBODIMENTS

First, a definition will be given for the term reliability as it is used here (definition according to Laubner/Göhner: Prozessautomatisierung 1 [process automation], $3^{rd}$ edition, Springer-Verlag):

Reliability is the capacity of a system to function properly for a predetermined time (also referred to as dependability).

The invention increases the reliability of battery systems compared to the prior art because the failure of an individual battery cell does not immediately result in the failure of the battery system. As opposed to the current prior art, with the present invention, in battery modules that have a series circuit of battery cells, the battery system is preferably modified internally by adding functional units that will be first described below:

Disconnecting devices $1d$, a schematic depiction of which is shown in FIG. $6a$ and one embodiment of which is shown in FIG. $6b$:

A disconnecting device $1d$ is used to disconnect the battery cells $1c$ of a first battery module 1 in monopolar fashion from one of the two poles $1a$, $1b$ of the battery module 1 and to connect the battery cells $1c$ in a low-impedance fashion to the corresponding pole $1a$, $1b$.

For a bipolar disconnection of the battery cells $1c$ from the two poles $1a$, $1b$ of the battery module 1, it is also possible to use two disconnecting devices $1d$ in a battery module 1 (it is practical to respectively provide one directly on the plus pole of the battery module and one directly on the minus pole).

The basic principle of the present invention is independent of the specific embodiment of the circuit breaker TS in the disconnecting device $1d$; it can be embodied among other things in the form of an electromechanical switch (relay or contactor), an electronic switch (semiconductor switch), or a combination of an electromechanical and electronic switch.

Figure 6A:
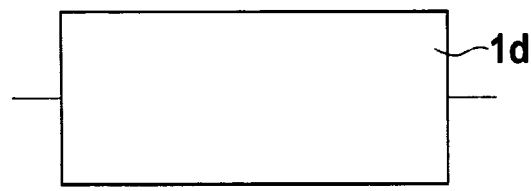
FIG. 6 shows a schematic wiring diagram of a disconnecting device according to a preferred embodiment of the invention.
Figure 6B:
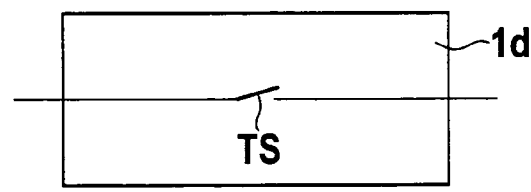

Charging and disconnecting devices $2d$, a schematic depiction of which is shown in FIG. $7a$ and one embodiment of which is shown in FIG. $7b$:

A charging and disconnecting device $2d$ constitutes the functional expansion of a disconnecting device $2d1$, which functions in the same way as the disconnecting device $1d$ described above in connection with FIG. 6 and has the same purpose, through addition of a charging device $2d2$, which limits the charging and equalizing currents that occur when the battery system or a battery module is switched on. These currents are caused by the input capacitances of the external systems, which before the battery is switched on, are generally not at the same voltage as the sum voltage of the battery system. In the simplest case, the charging and equalizing currents are limited by means of a resistance LW, which is connected in series with the charging switch LS. Through suitable selection of the resistance value, the equalizing currents are limited to permissible values for the battery system and for the external systems. If the voltage at the poles of the battery system or the voltage at the poles of a battery module 2 equipped with a charging and disconnecting device $2d$ is approximately the same voltage as the sum voltage of the corresponding battery cells $2c$ (i.e. the voltage drop at the charging resistance is low), then the circuit breaker TS in the charging and disconnecting device $2d$ can be closed. The switching-on procedure of a battery system or a battery module therefore occurs as follows: If the circuit breaker TS is open, then the charging switch LS of the charging and disconnecting module $2d$ is first closed. The external capacitances are then charged or recharged until the voltage at the poles of the battery system or battery module approximately corresponds to the sum voltage of the associated battery cells. Then, the circuit breaker TS is closed and the charging procedure is terminated. The battery cells are then connected in a low-impedance fashion to the poles of the battery system or battery module.

The circuit breaker TS and the charging switch LS of the charging and disconnecting module $2d$ can have the same concrete embodiment as the circuit breaker TS of the disconnecting device $1d$.

Bridging devices $1e$; $2e$, a schematic depiction of which is shown in FIG. $8a$ and one embodiment of which is shown in FIG. $8b$:

A bridging device $1e$; $2e$ is used to bridge a battery module 1, 2 in low-impedance fashion, i.e. to connect the plus and minus poles of the battery module 1, 2 in low-impedance fashion, upon failure of one or more battery cells $1c$, $2c$ in the battery module 1, 2.

The basic principle of the present invention is independent of the specific embodiment of the bypass switch US in the bridging device, which—as described in connection with the circuit breaker—can be embodied among other things in the form of an electromechanical switch (relay or contactor), an electronic switch (semiconductor switch), or a combination of an electromechanical and electronic switch.

Figure 4:
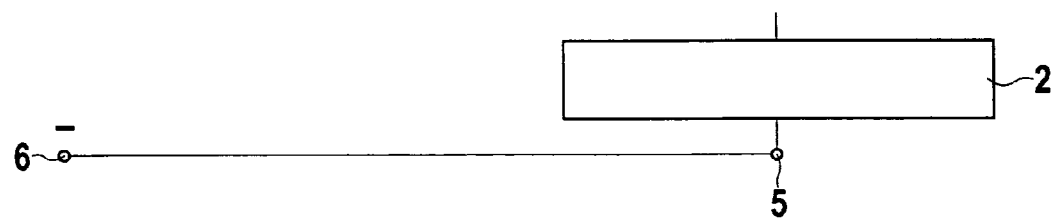
FIG. 4 shows a schematic wiring diagram of a first battery module according to a preferred embodiment of the invention.
Figure 4:
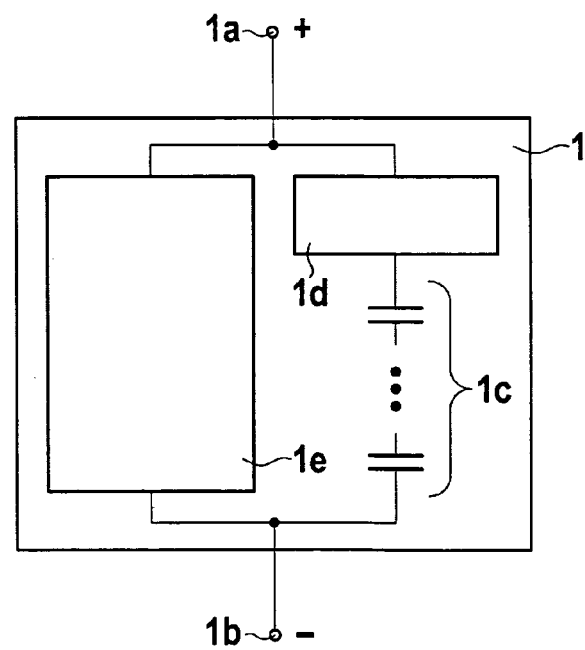

Battery modules can be constructed based on the above-described functional units and can then be connected to battery systems. Depending on the requirements placed on the battery system, it can be practical to use the following topologies for the battery modules:

First battery module (topology 1) with a disconnecting device and bridging device, as shown in FIG. 4.

In this topology, a disconnecting device $1d$ is used to disconnect the battery cells $1c$ in monopolar fashion from one of the two poles $1a$, $1b$ of the first battery module 1 and to connect the battery cells $1c$ to the corresponding pole $1a$, $1b$ in a low-impedance fashion. In FIG. 4, the disconnecting device $1d$ is shown situated on the plus pole $1a$, without limiting general design freedom.

The bridging device $1e$, which is arranged in parallel with the disconnecting device $1d$ and the battery cells $1c$, is used to bridge over the first battery module 1 in a low-impedance fashion upon failure of one or more cells $1c$ of the first battery module 1. The bypass switch in the bridging device $1e$ is preferably closed only if the circuit breaker in the disconnecting device is open.

The disconnecting device $1d$ and the bridging device $1e$ are triggered via signal lines to control and diagnose the battery module functional units, which are not shown.

Figure 5:
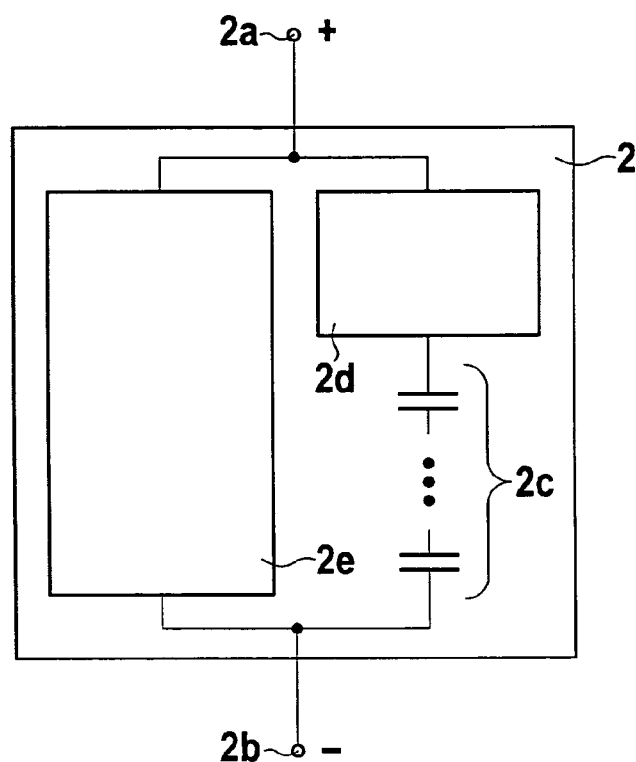
FIG. 5 shows a schematic wiring diagram of a second battery module according to a preferred embodiment of the invention.

Second battery module (topology 2) with a charging and disconnecting device and a bridging device, as shown in FIG. 5.

Figure 7A:
FIG. 7 shows a schematic wiring diagram of a charging and disconnecting device according to a preferred embodiment of the invention.
Figure 7B:
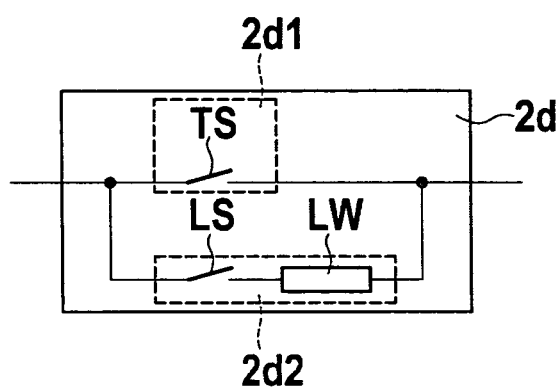
Figure 8A:
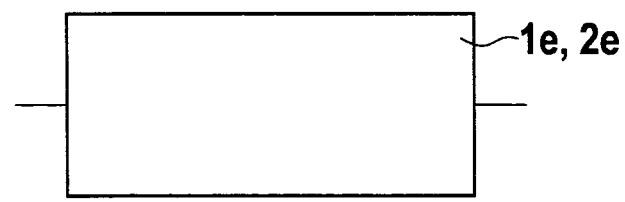
FIG. 8 shows a schematic wiring diagram of a bridging device according to a preferred embodiment of the invention.
Figure 8B:
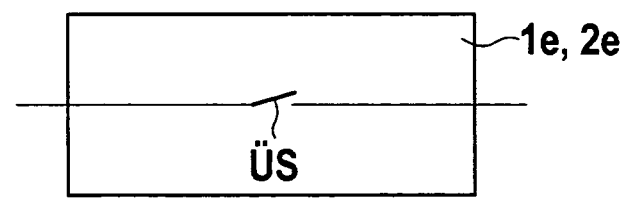
Figure 9:
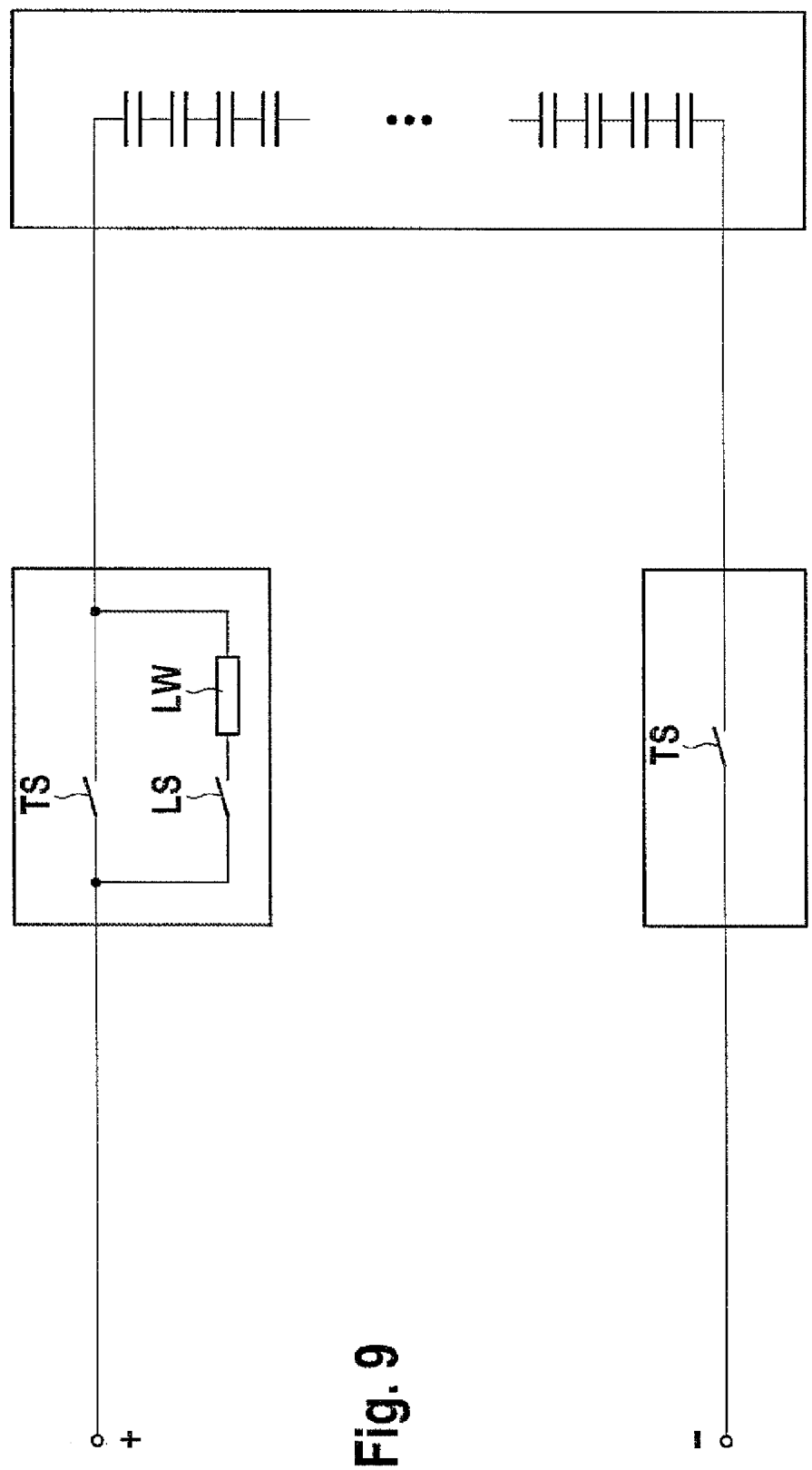
FIG. 9 shows a schematic wiring diagram of a traction battery according to the prior art.

By contrast with topology 1, in this topology, a charging device is additionally provided in the second battery module 2, i.e. a charging and disconnecting device $2d$ shown in FIG. 7 is used in lieu of the disconnecting device $1d$ to limit the charging and equalizing currents when the battery system is switched on (other properties equivalent to topology 1).

The charging and disconnecting device $2d$ and the bridging device $2e$ are triggered via signal lines to control and diagnose the battery module functional units, which are not shown.

The above-described battery modules are used according to the invention to construct modular battery systems that have an increased reliability by comparison with the current prior art. Three battery systems with different topologies (labeled topology A, B, and C) should be taken into consideration as examples for the interconnection of the above-described battery modules.

Figure 2:
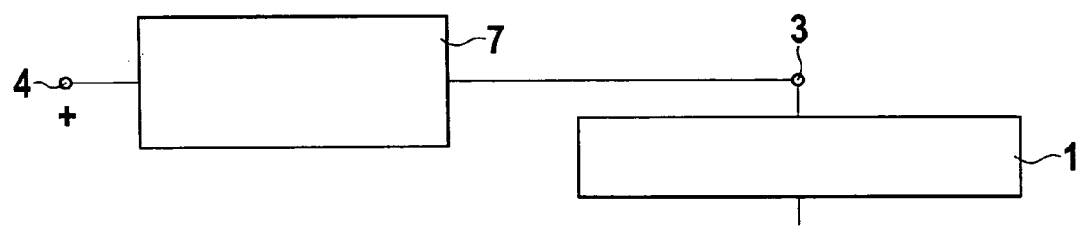
FIG. 2 shows a schematic wiring diagram of a battery, preferably a traction battery, according to a second preferred embodiment of the invention.

Battery system with topology A according to a second preferred embodiment of the invention, as depicted in FIG. 2, with
a separate charging and disconnecting device 7,
several first battery modules 1 (topology 1) connected in series.

Advantages:
Uniform battery modules are used.
All told, only one charging device is used, which is active when the battery system is switched on.

Figure 3:
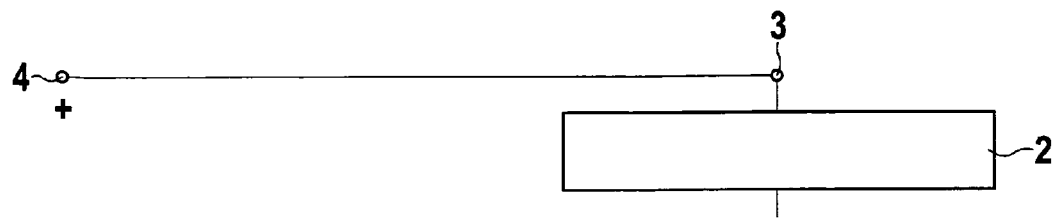
FIG. 3 shows a schematic wiring diagram of a battery, preferably a traction battery, according to a third preferred embodiment of the invention.

Battery system with topology B according to a third preferred embodiment of the invention, as depicted in FIG. 3, with
a plurality of second battery modules 2 (topology 2) connected in series.

Advantages:
Uniform battery modules are used.
Lower internal resistance by comparison with topology A since one fewer disconnecting device is connected in series.

Figure 1:
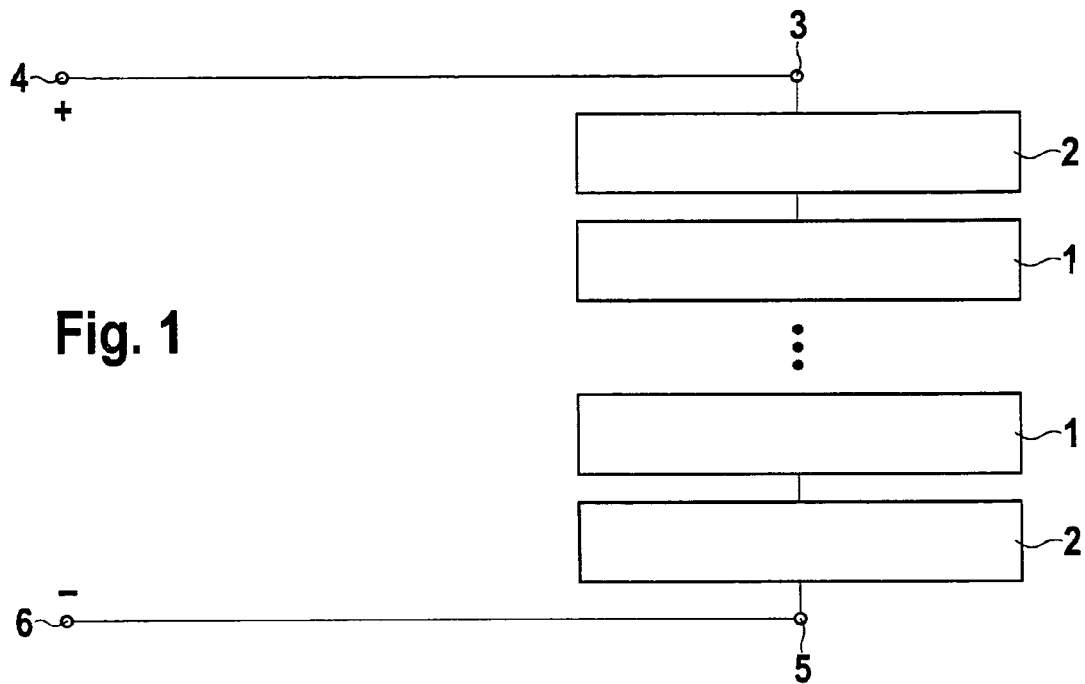
FIG. 1 shows a schematic wiring diagram of a battery, preferably a traction battery, according to a first preferred embodiment of the invention.

Battery system with topology C according to a first preferred embodiment of the invention, as depicted in FIG. 1, with
two second battery modules 2 (topology 2) connected in series,
one or more first battery modules 1 (topology 1) connected in series.

Advantages:
Lower internal resistance by comparison with topology A since one fewer disconnecting device is connected in series.
Lower additional cost, by comparison with topology B, for the charging devices, which are only provided in two battery modules (cost and space savings). Two battery modules with charging devices are required so that in the event of a malfunction in one of these two modules, after a bridging procedure, there is still one charging device for connecting the battery to the external systems.

The following applies to all of the above-described battery systems:

Upon failure of one or more cells in a battery module, after the disconnecting switch in the disconnecting device(s) is/are opened, the affected module can be short-circuited in a low-impedance fashion by closing the bypass switch.

Depending on the number of battery modules of the battery system and the number of bridged-over battery modules, there is then still a battery system available, which has the following data as compared to the regular operation with all battery modules.

| Battery system with n modules | Bridging of 1 module | Bridging of 2 modules | Bridging of n−1 modules |
|---|---|---|---|
| Reduction of power P to | $\frac{n-1}{n} \cdot P_{Regular}$ | $\frac{n-2}{n} \cdot P_{Regular}$ | $\frac{1}{n} \cdot P_{Regular}$ |
| Reduction of Energy E to | $\frac{n-1}{n} \cdot E_{Regular}$ | $\frac{n-2}{n} \cdot E_{Regular}$ | $\frac{1}{n} \cdot E_{Regular}$ |

In a battery system with 5 battery modules, after a battery module is bridged over, a battery system is available that still has 80% of the power and 80% of the energy of the complete battery system.

In addition to the above written disclosure, the disclosure in the figures is also expressly included herein by reference.

The foregoing relates to the preferred exemplary embodiments of the invention, it being understood that other variants and embodiments thereof are possible within the spirit and scope of the invention, the latter being defined by the appended claims.

The invention claimed is:

1. A battery, in particular a traction battery, comprising
at least two series-connected battery modules, each of which has a first battery module pole, a second battery module pole, and at least one series circuit and/or parallel circuit of battery cells connected between them;
a first terminal of the series circuit of battery modules is connected to a first battery pole, while a second terminal of the series circuit of battery modules is connected to a second battery pole, wherein
at least one battery module of the at least two serially connected battery modules is a first battery module, which has at least one disconnecting device and one bridging device;
when triggered accordingly, the at least one disconnecting device interrupts a connection between the series circuit and/or parallel circuit of battery cells and the first battery module pole and/or second battery module pole and/or interrupts the series circuit and/or parallel circuit of battery cells; and
when triggered accordingly, the bridging device, which is connected between the first battery module pole and second battery module pole, short-circuits the first battery module pole and the second battery module pole, and/or
at least one battery module of the at least two series-connected battery modules is a second battery module that has at least one charging and disconnecting device and one bridging device;
when triggered accordingly, the at least one charging and disconnecting device interrupts the connection between the series circuit and/or parallel circuit of battery cells and the first battery module pole and/or second battery module pole and/or interrupts the series circuit and/or parallel circuit of battery cells and limits charging or equalizing currents occurring when the battery module or the battery with the battery module is switched on; and
when triggered accordingly, the bridging device, which is connected between the first battery module pole and second battery module pole, short-circuits the first battery module pole and second battery module pole.

2. The battery according to claim 1, further comprising a charging device, which is connected between the first terminal of the series circuit of battery modules and the first battery pole and/or is connected between the second terminal of the series circuit of battery modules and the second battery pole, with the battery including only first battery modules.

3. The battery according to claim 2, wherein the bridging device is embodied so that it is able to produce a short-circuit of the first battery module pole and second battery module pole only if there is an interruption of the connection of the series circuit and/or parallel circuit of battery cells to the first battery module pole and/or an interruption of the connection of the series circuit and/or parallel circuit of battery cells to the second battery module pole and/or an interruption of the series circuit and/or parallel circuit of battery cells.

4. The battery according to claim 1, wherein the battery includes only second battery modules.

5. The battery according to claim 4, wherein the bridging device is embodied so that it is able to produce a short-circuit of the first battery module pole and second battery module pole only if there is an interruption of the connection of the series circuit and/or parallel circuit of battery cells to the first battery module pole and/or an interruption of the connection of the series circuit and/or parallel circuit of battery cells to the second battery module pole and/or an interruption of the series circuit and/or parallel circuit of battery cells.

6. The battery according to claim 1, wherein the battery includes n battery modules: 2 second battery modules and n−2 first battery modules.

7. The battery according to claim 6, wherein the bridging device is embodied so that it is able to produce a short-circuit of the first battery module pole and second battery module pole only if there is an interruption of the connection of the series circuit and/or parallel circuit of battery cells to the first battery module pole and/or an interruption of the connection of the series circuit and/or parallel circuit of battery cells to the second battery module pole and/or an interruption of the series circuit and/or parallel circuit of battery cells.

8. The battery according to claim 1, wherein the bridging device is embodied so that it is able to produce a short-circuit of the first battery module pole and second battery module pole only if there is an interruption of the connection of the series circuit and/or parallel circuit of battery cells to the first battery module pole and/or an interruption of the connection of the series circuit and/or parallel circuit of battery cells to the second battery module pole and/or an interruption of the series circuit and/or parallel circuit of battery cells.

* * * * *